May 25, 1971    J. R. STOUFFER ET AL    3,579,716
MEAT TENDERIZING METHOD
Filed Feb. 24, 1969    5 Sheets-Sheet 2

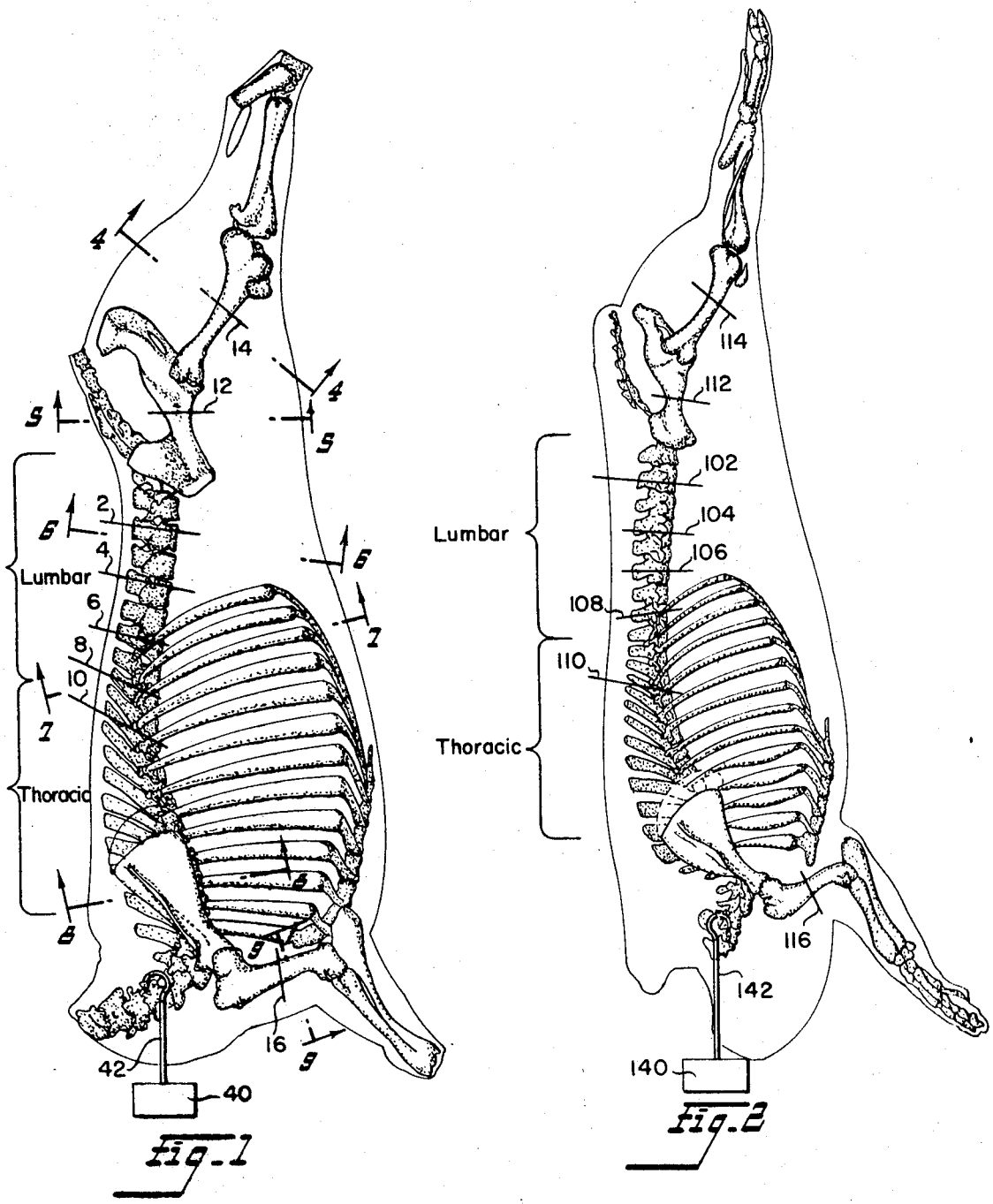

INVENTORS
James R. Stouffer
Dennis R. Buege
Wayne A. Gillis

BY Lawrence E. Laubscher
ATTORNEY

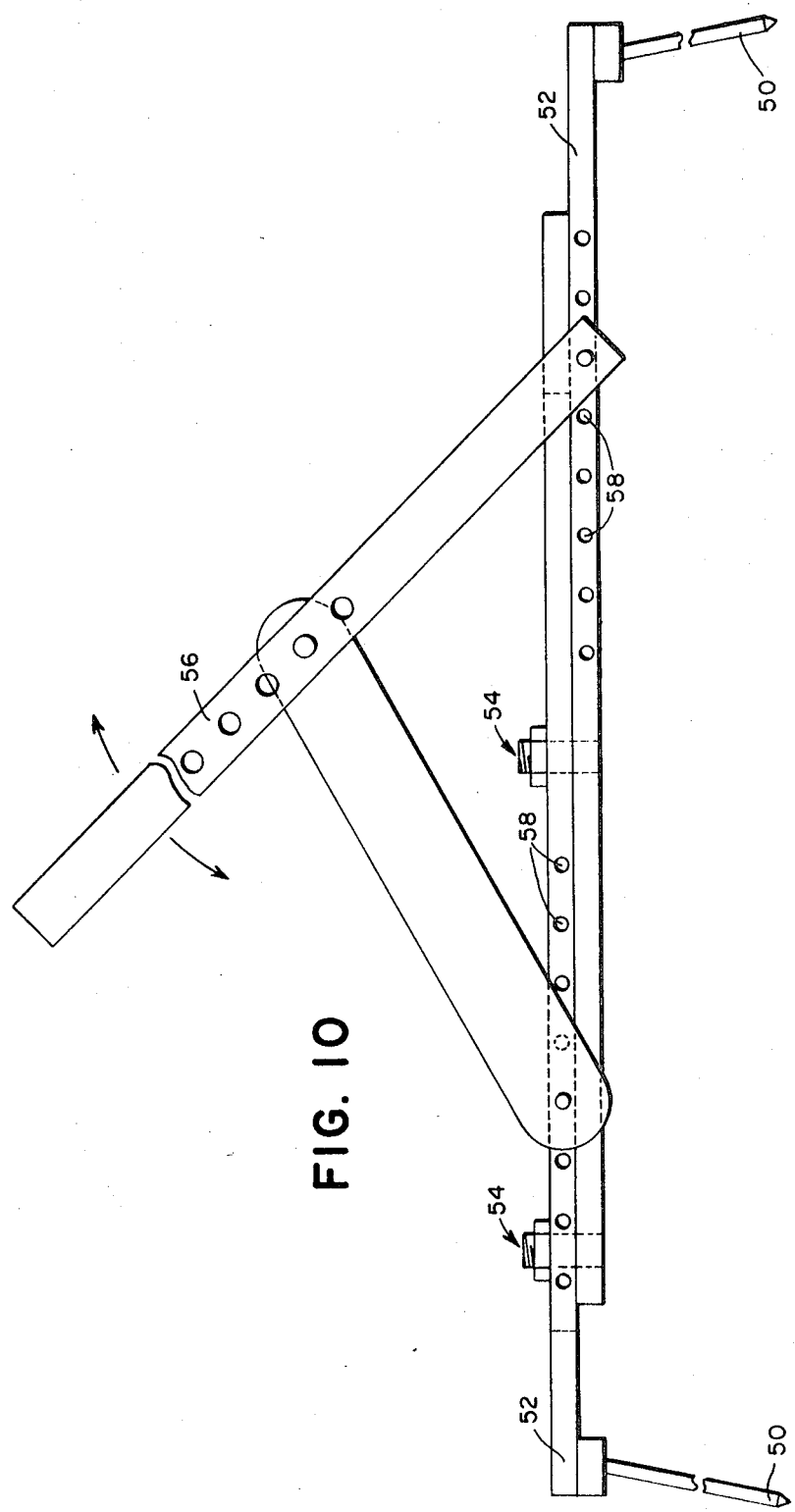

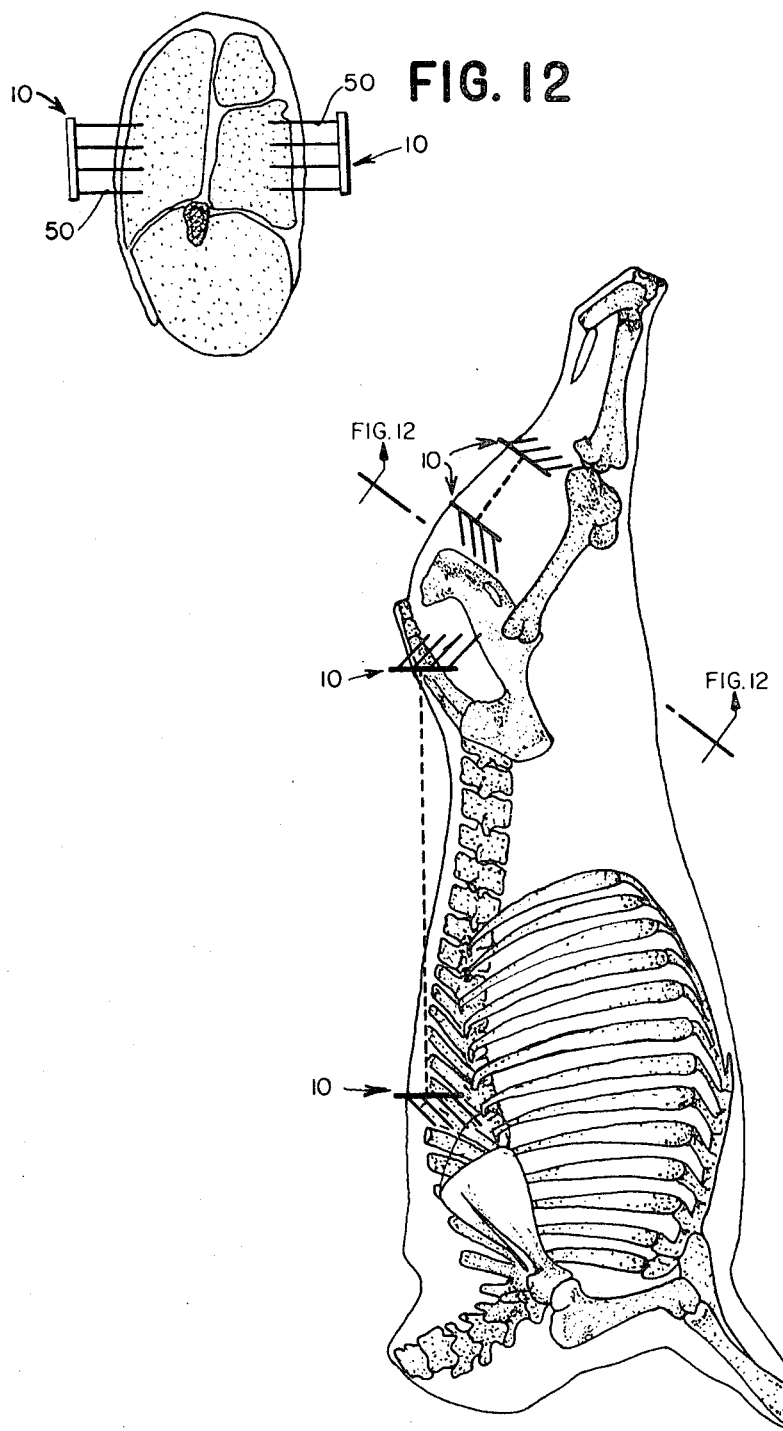

May 25, 1971  J. R. STOUFFER ET AL  3,579,716
MEAT TENDERIZING METHOD
Filed Feb. 24, 1969  5 Sheets-Sheet 5

Inventors:
James R. Stouffer
Dennis R. Buege
Wayne A. Sillis
By:
Lawrence E. Lautscher
Attorney United States Patent Office 3,579,716
Patented May 25, 1971

3,579,716
MEAT TENDERIZING METHOD
James R. Stouffer, Dennis R. Buege, and Wayne A. Gillis, Ithaca, N.Y., assignors to Cornell Research Foundation, Inc., Ithaca, N.Y.
Continuation-in-part of application Ser. No. 792,023, Jan. 17, 1969. This application Feb. 24, 1969, Ser. No. 801,483
Int. Cl. A22c 9/00
U.S. Cl. 17—45                                    21 Claims

ABSTRACT OF THE DISCLOSURE

A method of tenderizing a selected, intact muscle contained in the carcass of a recently slaughtered meat animal where that intact muscle is connected with a portion of the bone structure of the carcass, characterized by applying tension to that muscle in a direction so that it is extended and maintained in a stretched extended condition throughout the onset, duration and completion of rigor mortis in the carcass. The invention is particularly suitable for tenderizing the edible back, front leg, rear leg and rump portions of meat animals in general, and specifically, animals of the bovine, ovine and porcine species (i.e. beef, lamb and pork, respectively). Following completion of rigor mortis as aforesaid and/or additional amount of time representing the usual market handling time (i.e. 3–5 days), the treated meat will exhibit improved tenderness.

---

This application is a continuation-in-part application based on the prior application Ser. No. 792,023 filed Jan. 17, 1969 entitled, "Meat Tenderizing Method," now abandoned.

The present invention relates to a method for tenderizing muscles contained in the carcass of a recently slaughtered meat animal.

In the patented prior art, various chemical, electrical and temperature and humidity-controlled aging processes have been disclosed for tenderizing beef. Examples of such known processes are presented in the patents to Hogan et al. No. 3,163,540, Harsham et al. No. 2,544,681, Simjian No. 2,880,663 and Roschen et al. No. 2,519,931. Various types of mechanical meat tenderizing processes have also been proposed, including the teaching of the Deacon Pat. No. 1,784,580 wherein it was proposed to vertically jerk a suspended carcass and/or large cuts thereof to draw the sinews and thereby tenderize the same.

These known tenderizing processes of the patented prior art contain certain inherent drawbacks. For example, in the chemical processes it is difficult to determine with accuracy the specific dosage desirable for an animal of a given size, as well as the exact time of injection, locating the desired vein for injection, and similar pertinent parameters. Electrical processes require complex expensive equipment, are difficult to apply in controlled amount in correspondence to carcass size, and require precautionary safety measures. Aging in temperature and humidity-controlled storage facilities involves the provision of valuable space and expensive regulating and monitoring means. Moreover, traditional aging of beef is a time-consuming process (generally requiring on the order of from one to four weeks).

Recent research and articles in the technical literature have been directed toward overcoming the deleterious effects in meat that occur as a result of the chemical changes that accompany rigor mortis. It is well known that while a muscle is quite tender immediately after death, it becomes rather tough with the stiffening of rigor mortis, primarily because of the breaking down of glycogen by anaerobic glycolysis to form lactic acid (the production of which causes the post-mortem pH of the muscle to fall. Normally it takes from 4–6 hours for rigor to be complete, but this can vary a great deal depending on the temperature at which the muscle is held, the glycogen concentration in the muscle, and many other factors. Ultimate pH of the muscle may be reached from 30 minutes to 24 hours post-mortem, depending on the rate of glycolysis, and is usually between 5.5 and 5.7.

A number of studies have demonstrated that the contractile state of muscle does affect the tenderness in beef. Most of these studies were done by excising or removing the muscle from the animal immediately after slaughter and placing it under stress. Three scientific references of particular significance in this regard are: (1) Herring, H. K., R. G. Cassens and E. J. Briskey, 1965a. Sarcomere length of free and restrained bovine muscles at low temperature as related to tenderness. J. Sci. Food Agr. 16: 379; (2) Herring, H. K., R. G. Cassens and E. J. Briskey, 1965b. Further studies on bovine muscle tenderness as influenced by carcass position, sarcomere length and fiber diameter. J. Food Sci. 30(6): 1049; and (3) Gillis, W. A. 1967. The influence of tension during chilling on pre-rigor excised bovine muscles. M. S. Thesis, Oklahoma State University. (4) Herring, H. K., et al. 1967. Tenderness and associated characteristics of stretched and contracted bovine muscles. J. Food Sci. 32(3):317.

References 3 and 4 describe excising single muscles from the beef carcass or any substantial part of the beef carcass and fitting them into special apparatus for applying tension. Such a technique is impractical as a method for providing for the tenderization of meat in a commercial butchering operation where labor costs must always be considered. Prior to the present invention the techniques of references 3 and 4 were believed to be impractical as a method of tenderization with respect to a whole carcass, a split carcass or a large segment of the carcass of a meat animal.

Reference (2) investigated the influence of post mortem carcass position on tenderness of various muscles of beef carcasses. The reference does not describe whether the tenderness of position of the meat was due to extending or preventing the shortening of a muscle. For most, however, the reference does not describe a method for selectively extending a muscle or muscle system to provide improved tenderness in those selected muscles representing large and valuable parts of the meat carcass.

The prior art does not anticipate the possibility that a related muscle or muscle system intact in the carcass or part thereof is subjected to selective extension resulting in tenderization of the muscle because butchering techniques adopted many years ago where the carcass of the slaughtered animal is suspended by the rear legs results in what appeared to be an extending force due to carcass weight to be applied over a muscle system with resultant poor tenderness in major muscles because the major muscles instead of being extended by forces applied to their extremities were in fact shortened by adverse articulation of the associated bone structure (i.e. extending the backbone). On the other hand, if those of the prior art had adopted butchering practices producing a beneficial articulation of the bony structure (i.e. flexing the backbone) thereby allowing an extension of the major back muscles, they would have discovered a resulting improvement in tenderness as obtained by the teachings of the present invention.

In construing the teachings of the present invention, an intact muscle is one in which that muscle is maintained intact to the bone structure of the carcass or part thereof via a plurality of attachments. The word intact muscle may be considered as meaning an intact major muscle which to those skilled in the art includes an entire intact muscle system or part of a carcass (i.e. a back or leg). Accordingly, an intact muscle might be construed as comprising an individual large muscle and its surrounding and connected smaller muscles.

The primary object of the present invention is to provide a new and improved method for tenderizing a selected muscle tissue while it is actually contained in the carcass of a recently slaughtered meat animal, characterized in that an extending force is applied to said intact muscle so that muscle is maintained in an extended condition during the onset, duration and completion of rigor mortis in the muscle. While the process of the present invention is particularly adapted for tenderizing beef, lamb and pork, it is also applicable to other meats such as venison.

It is another object of the present invention to provide a new and improved method for tenderizing a selected muscle while it is actually contained in the carcass of a recently slaughtered meat animal, characterized in that an extending force is applied to said intact muscle and the beneficial articulation of the associated bone structure (i.e. flexing of the bone structure) resulting therefrom permits the force to extend said intact muscle and maintain that intact muscle in an extended condition during the onset, duration and completion of rigor mortis.

It is still another object of the present invention to provide a new and improved method for tenderizing a selected muscle such as the back muscles of a meat carcass while said back muscle system is actually contained in the carcass by applying an extending force to said back muscles via an instrument comprising a plurality of pins attached as a set to each end of an adjustable length bar wherein said set of pins may be forced into the carcass or part thereof so that the plurality of pins at each end of the adjustable length bar are fixed to the opposite ends of the selected muscle. More particularly, in the case of the back muscle, one set of pins might be inserted into the longissimus muscle at about the 6th thoracic vertebra, while the other set of pins may be inserted in the gluteus medius (at about the juncture of the femur and ilium bones) and said plurality of pins are forced apart causing extension of said selected intact muscle and the beneficial articulation of the associated bone structure (i.e. flexing of the backbone) therefrom by permitting the force to extend the selected muscle (i.e. the back muscles) and maintain that muscle in an extended condition during the onset, duration and completion of rigor mortis. In the alternative, tenderizing of a more extensive area could be accomplished by inserting pins in back muscles of the shoulder area at about the first thoracic vertebra, the other set of pins being inserted in the carcass as above.

It is another specific object of the present invention to extend an intact muscle of a recently slaughtered animal by applying an extending force to the remote ends thereof by using an extending tool attaching itself near the remote ends of the muscle with further means associated with that extending tool for applying force between said ends of the muscle so as to beneficially articulate the bone structure associated with said muscle and thereby causing an extension of said intact muscle which is maintained in that extended condition during the onset, duration and completion of rigor mortis.

It is another object of the present invention to provide an improved process for tenderizing a selected muscle tissue while it is actually contained in the carcass of a recently slaughtered meat animal, characterized in that the bone structure to which that attachments of the muscle are connected is severed so that the parallel major muscle is then tensioned by the weight of the hanging carcass and/or an applied force and maintained in an extended condition during the onset, duration and completion of rigor mortis in the muscle. While the process of the present invention is particularly adapted for tenderizing beef, lamb and pork, it is also applicable to other meats, such as venison.

According to a more specific object of the invention, the muscle to be tenderized is the longissimus or major back muscles of the animal, and the bone structure that is severed is the backbone. In the case of larger animals such as beef and pork, the carcass is eviscerated and longitudinally severed along the backbone in a conventional manner, whereby one longissimus muscle is contained in each carcass half. The backbone—which is visible on the split carcass half—is severed (preferably at several spaced locations), whereby the weight of the carcass half is sufficient to extend and maintain tension on the longissimus muscle during the passage of rigor mortis. If desired, additional weight may be added to the carcass for further tensioning of the muscle. In the case of a smaller animal often including lamb, the carcass is eviscerated and the backbone is severed at several points without longitudinally splitting the animal. In this instance, auxiliary weights may be added, if desired, to maintain extended the pair of longissimus muscles that are contained intact on opposite sides of the transversely severed backbone.

In accordance with another object of the invention, the selected muscle of the animal is the gluteus medius muscle, and the severed bone structure is the ilium. In a second form of the invention, the selected muscle is a rear leg muscle, and the severed bone structure comprises the femur. According to a further form, the selected muscle is a front leg muscle and the severed bone structure is the humerus.

A further object of the invention is to provide an extremely simple tenderizing process that requires only a few simple butchering steps using conventional tools such as a butcher's saw, whereby the aging time is reduced. Consequently, not only are all the drawbacks of the known tenderizing processes avoided, but also may the invention be practiced by the usual butchering personnel using conventional equipment to inexpensively achieve an unusually high quality tenderized product in an extremely short period of time.

Other objects and advantages of the invention will become apparent from a study of the following specification when viewed in the light of the accompanying drawing, in which:

FIGS. 1, 2 and 3 illustrate the bone skeleton structures of beef, pork and lamb carcasses, respectively.

FIG. 10 shows a tool which may be used in practicing the present invention when an extending force is required to be applied to intact muscles within a carcass.

FIG. 11 shows an intact carcass wherein the bone and intact muscles are illustrated in a manner which they would appear prior to the application of an extending force to an intact muscle (i.e. the back muscles through the forcing tool also shown or the muscles of the round through a forcing tool also shown).

FIG. 12 shows a portion of an animal carcass comprising a cross section posterior to the pelvic bone illustrating how the extending force may be applied to the muscles of the round shown therein. Only one end of the extending tool is shown for each round muscle.

Figure 3:
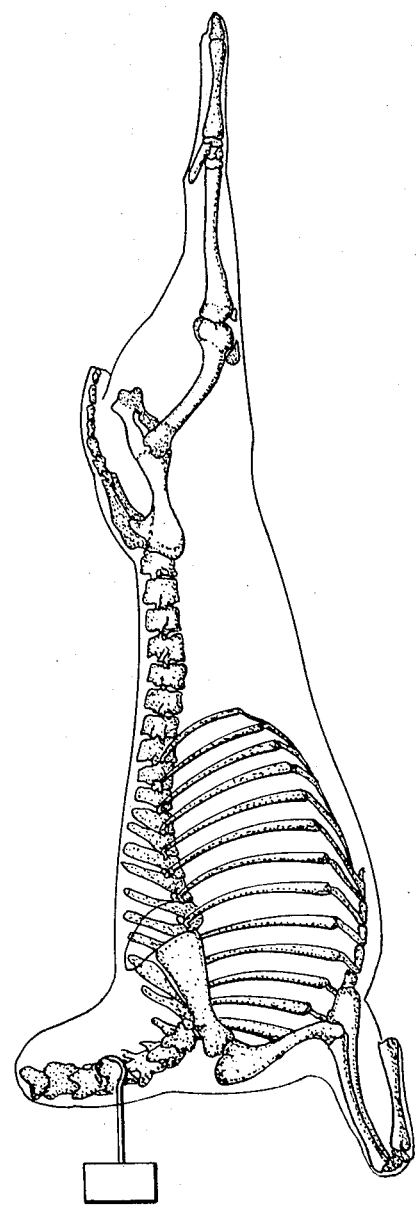
Figure 4:
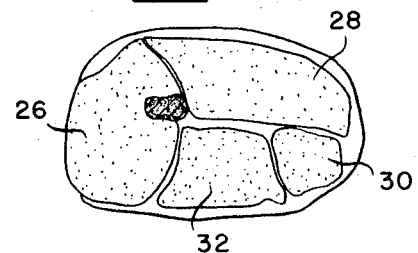
FIGS. 4–9 are sectional views taken along lines 4—4, 5—5, 6—6, 7—7, 8—8, and 9—9, respectively, of FIG. 1.

Referring first to the beef skeleton structure of FIG. 1, it should be mentioned that the selected edible muscles to be tenderized are normally connected when intact to bone structure of the carcass via a plurality of attachments. In the case of beef, the carcass has been suspended by its rear legs from a fixed support, and longitudinally split vertically by sawing along the backbone, whereby each split carcass half contains the split exposed vertebrae and one front and one rear leg. For tenderizing the longissimus or back muscle contained by each carcass half, the backbone is severed by sawing at several spaced locations 2, 4, 6 and 8 in the lumbar region, and, if desired, at one or more locations 10 in the adjacent thoracic region. The weight of the carcass half and/or additional force (i.e. applied via weights) are utilized to tension and extend the longissimus muscle, and assuming that this tension is maintained prior to the onset of, throughout the period of, and following the completion of rigor mortis (i.e. for a period up to about 24 hours), the resultant muscle will be of improved tenderness. In FIG. 1 the weight 40 is applied by connecting it to the carcass half by a meat hook 42 in the neck region as shown. By way of example, in working with beef carcass halves weighing 300 pounds each, weights ranging from 20–100 pounds have been used satisfactorily to improve tenderness. The beef carcass may then be handled in a standard fashion in the marketing process. However, its tenderness will continue to improve with a major improvement occurring in the first five days when stored at a temperature no colder than 34° F. In fact, during this period of improving tenderness the beef carcass may be cut into primal cuts.

Referring again to FIG. 1, to tenderize muscles in the sirloin and rump portions, such as the gluteus medius muscle, for example, the ilium is severed at the location 12, whereupon the weight of the carcass half tensions and maintains extended the corresponding muscles. With regard to muscles in the rear leg, the overlying leg muscles are manually spread apart to afford access to the femur at location 14, whereupon the bone is severed and the corresponding muscles are tensioned and maintained extended during rigor mortis. In the case of the front leg muscles, the humerus is severed at location 16 and the fore leg is tensioned (preferably by the application of auxiliary weight thereto), whereupon the associated muscles are stretched and maintained tensioned during rigor mortis.

In the case of the major muscle along the back, satisfactory results have been shown with severing between every vertebrae. However, improved tenderness may be obtained to a modified degree according to the teachings of the present inventors by cutting the vertebrae at fewer locations so long as the major muscle may be placed in effective tenson as aforesaid.

In the case of pork, the tenderizing process requires the preliminary step of removing the fat cover prior to the severing of the bones, so that the muscles may be tensioned and maintained extended during rigor mortis. Since the skeleton structures are similar, the porcine skeleton is severed along lines 102, 104, 106, 108, 110, 112, 114 and 116 for tensioning the corresponding longissimus, gluteus medius, rear leg and fore leg muscles.

As shown in FIG. 3, the ovine skeleton structures correspond to the bovine and porcine structures in FIGS. 1 and 2, and consequently the corresponding bone structures are severed to permit tensioning and extension of the associated muscles during rigor mortis. However, since the lamb carcass is not generally split longitudinally, the backbone must be severed in some different manner than by the simple sawing operations normally used in the practicing of the invention on beef or pork. Thus, following evisceration of the suspended carcass, a suitable tool (similar to a sharp chisel, pruning shears, or the like) is inserted into the carcass cavity to sever the backbone at spaced locations (similar to those shown in FIGS. 1 and 2). Auxiliary weights are then suspended from the neck area of the carcass to tension and maintain extended during rigor mortis the pair of longissimus muscles on opposite sides of the backbone. In FIG. 3, the weight is applied by connecting it to the neck region as shown. By way of example, when working with a lamb carcass weighing 50 pounds, weights ranging from 10–40 pounds may be used satisfactorily to improve tenderness.

Figure 5:
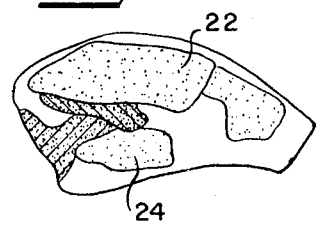
Figure 6:
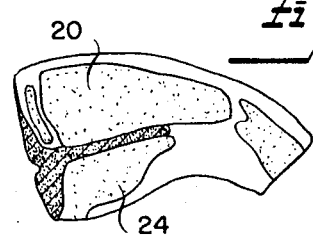
Figure 7:
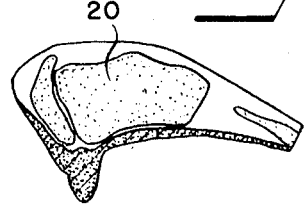
Figure 8:
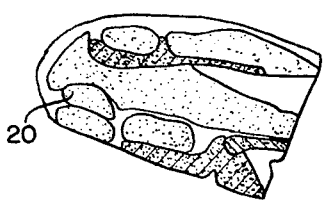
Figure 9:
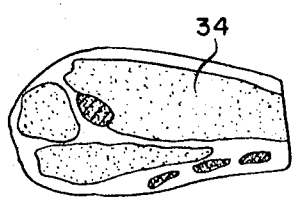

Referring now to the sectional views of FIGS. 4–9, it will be seen that the longissimus muscle 20 of FIGS. 5–7 extends across the lumbar and thoracic regions of the carcass, which muscle (otherwise known as the rib eye or loin eye muscle) decreases in size as it progresses forwardly of the carcass. The gluteus medius (or top sirloin) muscle 22 is contained in the hip region adjacent the ilium, and the various round muscles 26, 28, 30, 32 are contained in the upper rear leg. The triceps brachii (boneless shoulder steak) muscle 34 is contained in the fore arm area around the humerus. Since the longissimus muscle constitutes approximately 10% of the edible muscle, and since the muscles identified above constitute about 30 to 35% of the muscle mass, it will be seen that a rather large proportion of the edible muscle of the carcass can be favorably tenderized by the practice of the present invention.

FIG. 10 shows a tool which may be used in practicing the present invention when an extending force is required to be applied to intact muscles within a carcass. This apparatus consists of a plurality of pins 50 bounded by a cross member on each of two adjustable bars 52 locked by locking mechanism number 54. Extending force is applied by lever system 56 which is attached to adjustable bars.

Shown in FIG. 11 for the purpose of depicting the teachings of the present invention as it applied to meat animals is a beef carcass representing the carcass of a freshly slaughtered animal resulting from conventional butchering techniques. As will be noted, the backbone is in an extended condition (known as adverse articulation) thereby causing the related back muscles to be shortened as the process of rigor mortis proceeds from onset through duration and completion.

Also shown is a typical adverse articulation of the pelvic and leg bones (also known as an extended position). Without the teachings of the present invention, the muscles of the round associated therewith would shorten during the onset, duration and completion of rigor mortis.

Applying the teachings of the present invention to FIG. 11, a muscle extending apparatus of the type exemplified by FIG. 10 may be used as also shown in FIG. 11. It should be noted and emphasized that the apparatus of FIG. 10 is merely illustrative. Any force giving apparatus providing equivalent function could be used.

Specifically, in order to improve the tenderness of muscles related to the backbone, the pins 50 of one set are inserted into the longissimus muscle at about the 6th thoracic vertebrae and the other set of pins 50 are inserted into the gluteus medius muscle at about the junction of the pelvic bone and the leg bone. In the alternative, in order to tenderize a more extensive area, the first set of pins may be inserted in back muscles of the shoulder area at about the first thoracic vertebra, said other set of pins being inserted as above.

Forces then applied operate the two sets of pins in the manner shown thereby applying an extended force to the related back muscles in which the pins are set allowing the adverse articulation (extension) of the backbone to be converted to beneficial articulation (flexion) so that the back muscles, during the onset, duration and completion of rigor mortis, may be improved with respect to tenderness.

In further applying the teachings of the present invention, the muscle extending apparatus of the type exemplified by FIG. 10 is used specifically to improve the tenderness of muscles of the rear leg by inserting one set of the pins 50 into the semimembranosus muscle posterior to the pelvic bone and the other set of pins 50 are inserted into the same muscle near the stifle joint. Forces then applied operate the two sets of pins in the manner shown thereby applying an extended force to the related leg muscles in which the pins are set allowing the adverse articulation (extension) of the pelvic and leg bones to be converted to beneficial articulation (flexion) so that the leg muscles are extended during the onset, duration and completion of rigor mortis thereby improving the tenderness.

FIG. 12 shows a transverse sectional view of the major muscles of the rear leg posterior to the pelvic bone along line 10—10 of FIG. 11. The plurality of pins from one end of the muscle extending apparatus are inserted in the major muscle of the inside leg muscle. The second set of pins are shown inserted into the major muscles of the outside of the leg muscle consisting of semitendinosus and biceps femoris. Herein is described a manner by which the muscle extending apparatus may be applied to both sides of the leg muscles although improvement in tenderness may be accomplished through the use of only one set of extending apparatus. The other muscle is normally held in a flexing condition and thereby does not require extension in order to achieve improved tenderness.

Figure 13:
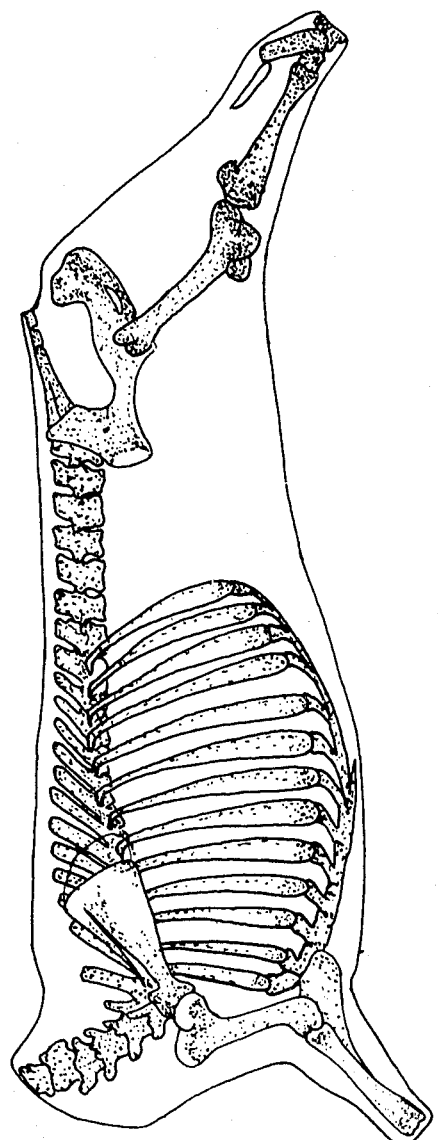
FIG. 13 shows the same carcass of FIG. 11 after the muscle extending forces have been applied and after removal following the completion of rigor mortis.

Shown in FIG. 13 for the purpose of depicting the teachings of the present invention, a beef carcass is illustrated in which the muscle extending apparatus has been applied to the back muscles and to the leg muscles prior to, during and after the completion of rigor mortis. The apparatus was then removed with the carcass attaining the shape and relative positions as depicted with the resulting improvement in tenderness of the major intact muscles of the back and rear leg. It should be noted that the conformation of the carcass is such that the muscles are now in the extended condition in accordance with the inventive concepts of the present invention. The tendons on the anterior side of the stifle joint may be severed in order to facilitate the extension of the intact major muscles of the rear leg of carcasses.

In carcasses such as lamb, the intact back muscles and rear leg muscles may be extended prior to the onset of rigor mortis and maintained in the extended condition during and through the completion of rigor mortis as the backbone and rear leg bones are maintained in a flexed position by suspending the carcass in a vertical position through the use of a hook anterior to the pelvic bone on an unsplit carcass. The rear shank bones may be supported by supplemental short hooks.

What is claimed is:
1. The method of tenderizing a selected intact portion of a muscle system contained in the carcass of a newly slaughtered meat animal prior to the onset of rigor mortis therein, said muscle system being connected with the bone structure of the carcass, comprising the steps of:
  effecting a longitudinal tensioning force between opposite ends of said selected muscle system portion over a major extent of its length prior to the onset of rigor mortis; and
  maintaining the muscle in the extended condition through the completion of rigor mortis.
2. The method as recited in claim 1, wherein said longitudinal tensioning of the selected portion of said muscle system is effected by the steps of:
  physically engaging said selected muscle system portion at a first location adjacent one end thereof;
  physically engaging said muscle system portion at a second location adjacent the other end thereof; and
  mechanically separating said first and second locations to apply the desired longitudinal tensioning force directly to the selected muscle system portion and thereby extend the selected muscle portion prior to the onset of rigor mortis.
3. The method as defined in claim 2, wherein said selected muscle system portion is the back muscle system, wherein said first location is a position on the gluteus medius muscle adjacent the juncture of the femur bone with the ilium, and wherein said second location is a position on the longissimus muscle at about the 6th thoracic vertebra.
4. The method as defined in claim 2, wherein said selected portion of the muscle system is the back muscle system, wherein said first location is a position on the gluteus medius muscle adjacent the juncture of the femur bone with the ilium, and wherein said second location is a position on the shoulder muscle system at about the first thoracic vertebra.
5. The method as defined in claim 2, wherein said selected portion of the muscle system is the rear leg muscle, wherein said first location is a position on the semimembranosus muscle posterior to the pelvic bone and the second location is a position on the same muscle adjacent the stifle joint.
6. The method as defined in claim 1, wherein the longitudinal tensioning of the selected muscle system portion is effected by attaching a hook to the carcass adjacent the pelvic bone, and suspending the carcass in a vertical position prior to and throughout the completion of rigor mortis, whereby the backbone and rear leg bones are maintained in a flexed condition.
7. The method as defined in claim 1, wherein the longitudinal tensioning of the selected muscle system portion comprises the steps of:
  severing that region of the carcass bone structure to which said selected intact muscle system portion is connected at least on location between the ends of said selected muscle system portion; and
  applying sufficient tension to the muscle system portion to extend the same prior to the onset of rigor mortis.
8. The method as defined in claim 7 wherein the tensioning step comprises suspending the carcass at on end from a fixed support.
9. The method as defined in claim 8, wherein the tensioning step further comprises applying an additional gravity load to the other end of the carcass.
10. The method as defined in claim 7, wherein said selected muscle system portion comprises the intact longissimus muscle of the animal, and further wherein said bone structure region comprises the backbone of the animal.
11. The method as recited in claim 10, wherein the backbone is severed at a plurality of longitudinally spaced locations.
12. The method as recited in claim 10, wherein the backbone is severed in the lumbar region.
13. The method as defined in claim 12, wherein the backbone is further severed at that portion of the thoracic region that is adjacent the lumbar region.
14. The method as defined in claim 10, wherein the animal is of the ovine species for lamb.
15. The method as defined in claim 10, and further including the preliminary step of longitudinally splitting the carcass along its backbone between the longissimus muscles to define two carcass halves.
16. The method as defined in claim 15, wherein the animal is of the bovine species for beef.
17. The method as defined in claim 15, wherein the animal is of the porcine species for pork, and further including the step of removing the fat cover from each carcass half prior to the severing of the said bone structure portion thereof.
18. The method as defined in claim 7, wherein the said given muscle comprises the gluteus medius muscle, and wherein the said bone structure portion comprises the ilium.
19. The method as defined in claim 7, wherein the said given muscle comprises at least one of the rear leg muscles, and wherein the said bone structure portion comprises the femur.

20. The method as defined in claim 19, and further including the preliminary step of separating the overlying rear leg muscles to expose and thereby permit the severing of the femur.

21. The method as defined in claim 7, wherein the muscle is one of the front leg muscles, including the prelininary step of separating the overlying front leg muscles covering the humerus, and further wherein the bone structure portion is the humerus.

References Cited

UNITED STATES PATENTS

| | | | |
|---|---|---|---|
| 1,614,312 | 1/1927 | Miller | 17—45X |
| 2,026,242 | 12/1935 | Miller | 17—45X |

LUCIE H. LAUDENSLAGER, Primary Examiner

U.S. Cl. X.R.

17—25